United States Patent

[11] 3,601,269

[72] Inventor Edward F. Heinig
 North Haven, Conn.
[21] Appl. No. 17,396
[22] Filed Mar. 9, 1970
[45] Patented Aug. 24, 1971
[73] Assignee O. F. Mossberg & Sons, Incorporated
 North Haven, Conn.

[54] BOAT AND TRAILER COMBINATION HAVING HOISTING MEANS FOR INVERTING THE BOAT AS IT IS LOADED AND UNLOADED
11 Claims, 9 Drawing Figs.

[52] U.S. Cl. .................................................. 214/75,
 214/1 A, 214/1 Q, 214/450
[51] Int. Cl. ...................................................... B60p 1/44
[50] Field of Search ............................................ 214/75,
 450, 85.5; 212/3, 8

[56] References Cited
UNITED STATES PATENTS
3,435,970 4/1969 Sutton .......................... 214/450
3,512,655 5/1970 Kuhtz ........................... 212/3

Primary Examiner—Gerald M. Forlenza
Assistant Examiner—Lawrence J. Oresky
Attorneys—Steward & Steward, Merrill F. Steward, Donald T. Steward and Walter D. Hunter ABSTRACT: A boat and trailer combination in which a hoisting attachment is provided for pivoting the boat either end-over-end or sideways about detachable hinges, by which the boat is connected to the trailer, from an inverted position on the trailer to an upright position beside the trailer. The hoisting attachment includes a mast which provides an elevated position from which to lift the boat about the hinges and a winch which is desirably designed so that the cable can be paid out only by reversing the operating input to the winch, as by reversing the direction in which the handcrank is rotated. By locating the mast near the axis of the hinges, rotation of the crank on the winch in one direction raises the boat up to the mast, and then after the boat swings past the mast, the crank on the winch is reversed so that the boat is gently lowered from the mast to a position adjacent the trailer or onto the trailer, depending on whether the boat is being unloaded or loaded.

PATENTED AUG 24 1971

INVENTOR:
EDWARD F. HEINIG

BY Steward + Steward his ATTORNEYS.

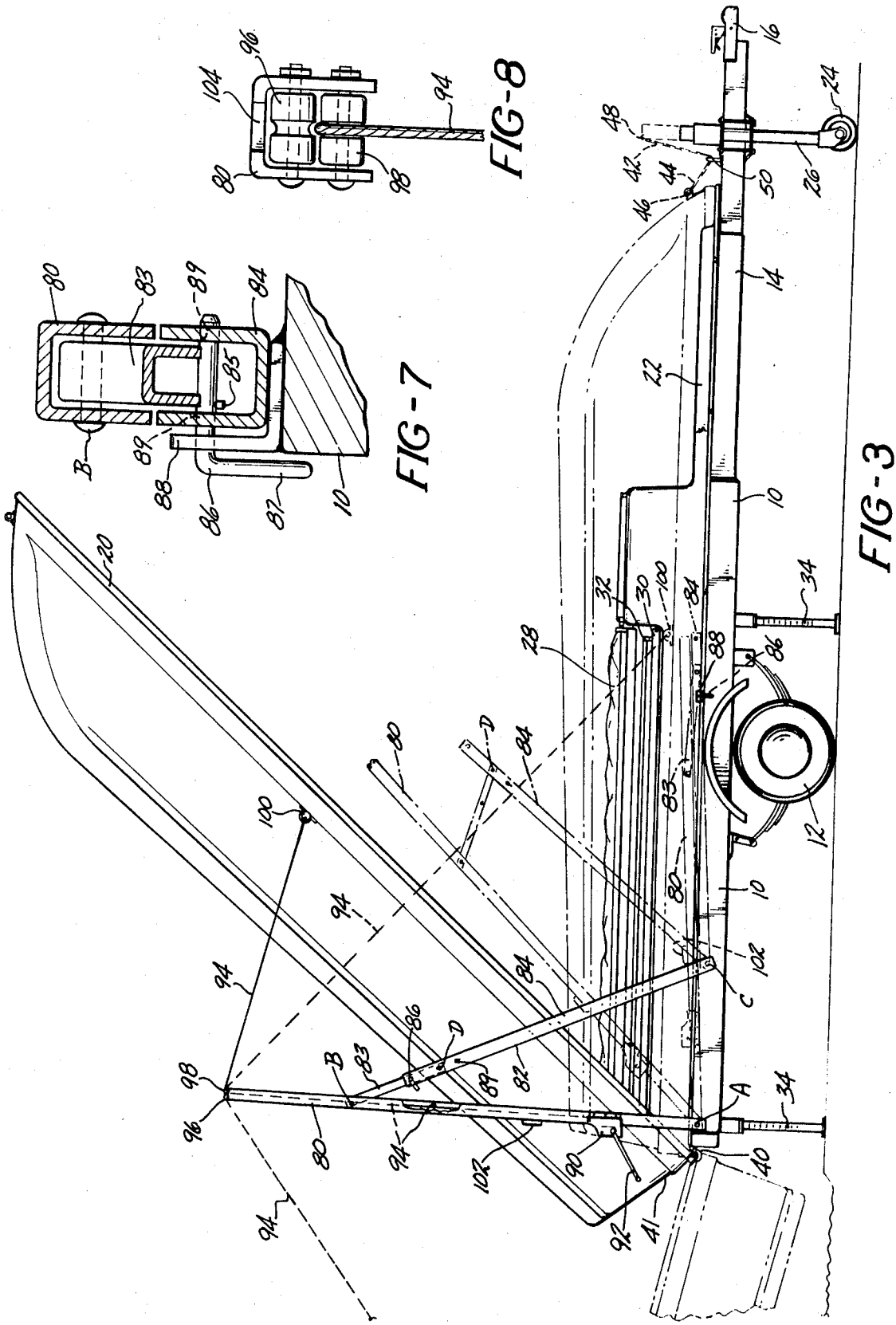

PATENTED AUG 24 1971
3,601,269
SHEET 3 OF 3
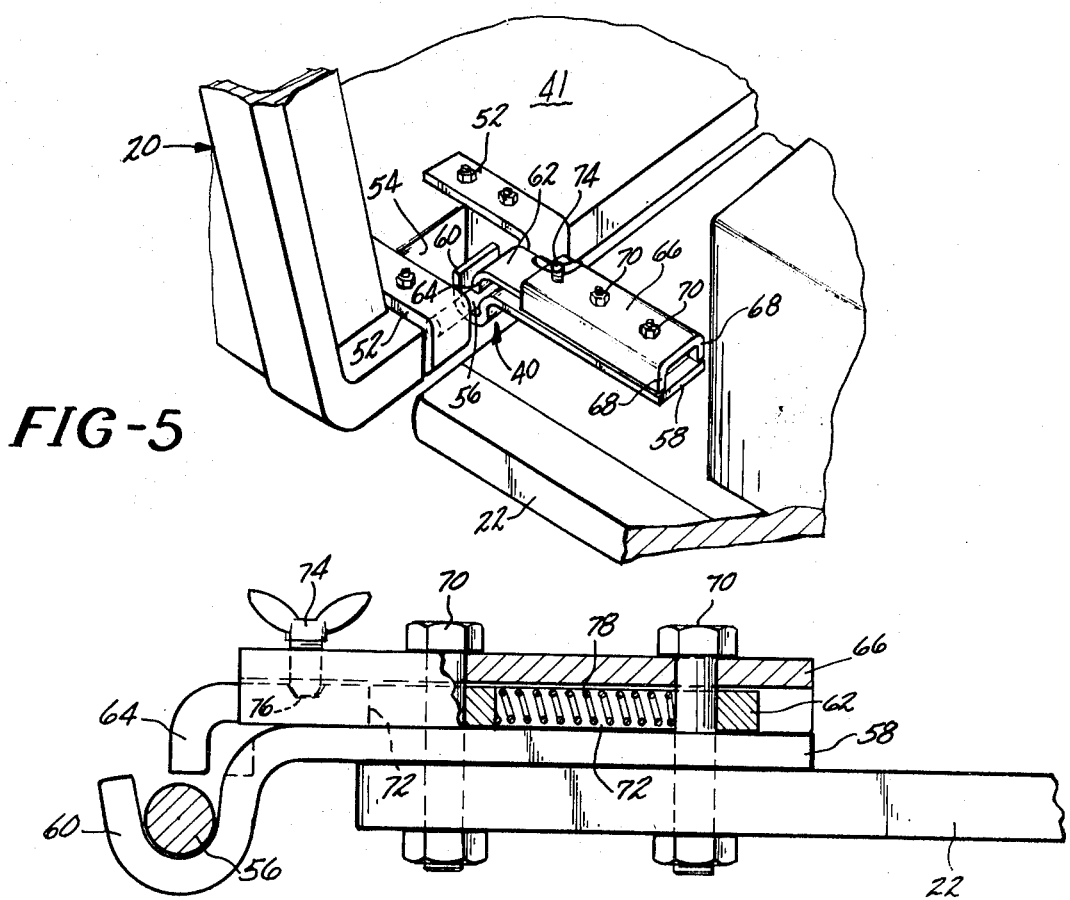
FIG-5
FIG-6
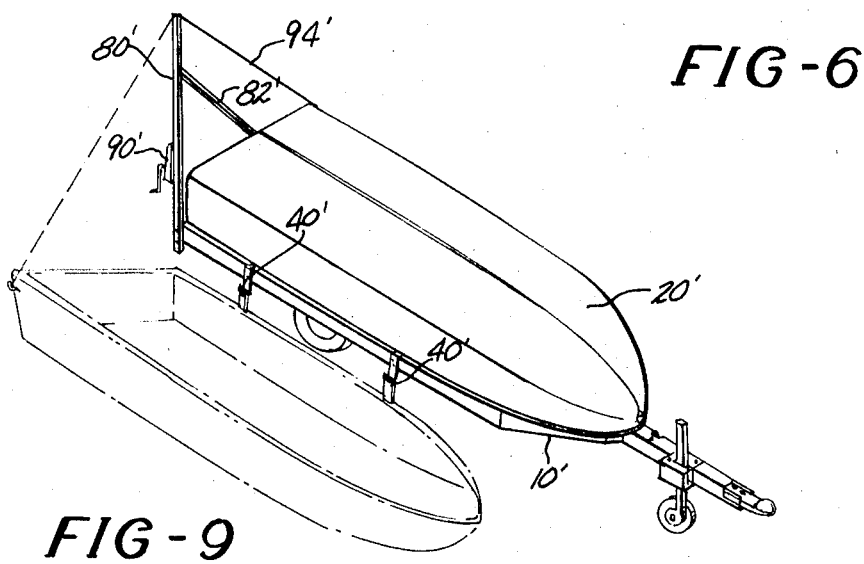
FIG-9

BOAT AND TRAILER COMBINATION HAVING HOISTING MEANS FOR INVERTING THE BOAT AS IT IS LOADED AND UNLOADED

BACKGROUND OF THE INVENTION

The invention relates to boat camp trailers, and it relates more particularly to means for loading and unloading a boat onto and off a trailer by which it is transported form one place to another.

Many sportsmen and campers carry a small boat on a trailer that is drawn behind an automobile or light truck so that when they reach their destination they can use the boat for fishing, duck hunting or boating in general. If the boat is large enough to be fairly stable in the water, it is usually too heavy for one person to launch from the trailer. This is especially true in areas where there are no launching ramps or beaches suitable for backing the trailer into the water so that the boat can be floated off the trailer in the usual manner. Moreover, if the trailer is equipped to carry camping equipment, such as tents, mattresses and cooking utensils, it can not be submerged far enough into the water to float the boat, unless such equipment is first removed from the trailer.

The purpose of the present invention is to provide a convenient system for loading and unloading a boat onto and off a trailer, so that it can be done entirely by one person without straining himself and without submerging the trailer in the water.

One approach to this problem is shown in the patent to Gorman U.S. Pat. No. 3,348,874, in which a boat is carried on a trailer upside down and is hinged along the top edge of its transom to the rear of the trailer. In order to unload the boat, the bow is lifted so that the boat is pivoted end-over-end about the hinges at the stern and deposited in the water or on the beach in back of the trailer. A winch is mounted in an elevated position on the tongue of the trailer in front of the boat with the winch cable fastened to the bow of the boat. In unloading the boat, the bow must be manually lifted to a vertical position without the assistance of the winch. Once the boat is vertical, tension is taken on the winch cable, so that as the boat is lowered to the rear of the trailer, the winch is used to let it down. The primary advantage of pivoting the boat end-over-end into the water is that the boat can be deposited directly in the water or at the water's edge without backing the trailer into the water. Furthermore, it is not necessary to drag the boat on the shore to or from the water, so that the boat can be launched from almost any type of shore, including rocky ones.

The present invention incorporates a system that is similar to that disclosed in the Gorman patent in that the boat is carried on the trailer in an inverted position and is hinged thereto in such a manner that it is turned over as it is unloaded and deposited right side up on the ground or in the water. However, as will become more apparent hereinafter, the present invention provides substantial improvements and advantages over the Gorman boat camp trailer. One of the more important advantages is that it does not require the person launching the boat to lift it by hand into the vertical position in order to unload, or lower it by hand from the vertical position onto the platform of the trailer when it is being loaded.

Furthermore, in boat camp trailers of the present invention, the pull of the winch cable is always in a direction that provides adequate leverage to hold the weight of the boat without undue strain on the rigging and also to maintain complete control of the boat solely by means of the winch, which does almost all the work in lifting the boat, either when unloading it or in loading it onto the trailer. Likewise, the boat is positively lowered by means of the winch from its vertical position to the platform on which it rests on the trailer during loading, as well as to the ground when unloading, thereby safeguarding against the boat accidentally dropping from its elevated position and possibly injuring someone who might be in its way. Another advantage of the invention over the Gorman arrangement is that it can be employed to pivot a boat to one side of the trailer, instead of end-over-end, by hinging the boat along one gunwale to the side of the trailer.

SUMMARY OF THE INVENTION

The foregoing improvements and advantages are attained by locating a hoisting mast near the pivot axis about which the boat is hinged to the trailer but clear of the boat in the direction of said axis, so that the mast does not interfere with the boat as it is being turned over. The hoisting line or winch cable is connected to the boat at a convenient distance from the pivot axis in order to provide the desired leverage in lifting the boat about said axis. Rollers or other suitable guide means, over which the hoisting line is trained, are mounted on the mast substantially vertically above the pivot axis at a distance that is approximately equal to the distance from said axis to the point at which the hoisting line is connected to the boat, such that said point of connection passes near the rollers on the mast as the center of gravity of the boat passes the vertical plane through the pivot axis. Consequently, as the boat reaches the vertical position and starts to swing down, the winch cable remains taught and prevents the boat from flopping from one side to the vertical position to the other.

DESCRIPTION OF PREFERRED EMBODIMENTS

In the drawings,

FIG. 3 is a side elevational view similar to FIG. 1, but on a larger scale and showing the boat in various positions as it is being loaded onto, or unloaded from, the trailer;

FIG. 5 is a detailed perspective view of a hinge assembly for connecting the boat to the trailer;

FIG. 6 is a side elevational view of the hinge assembly shown in FIG. 5 but on a larger scale, portions being broken away and shown in section;

FIG. 7 is an enlarged detail cross-sectional view of the nested mast assembly taken on the line 7—7 of FIG. 1;

FIG. 8 is an enlarged detail plan view of the top of the hoisting mast; and

FIG. 9 is a more or less diagrammatic perspective view similar to FIG. 2, but illustrating another embodiment of the invention in which the boat is loaded and unloaded over the side of the trailer in accordance with the invention.

Figure 1:
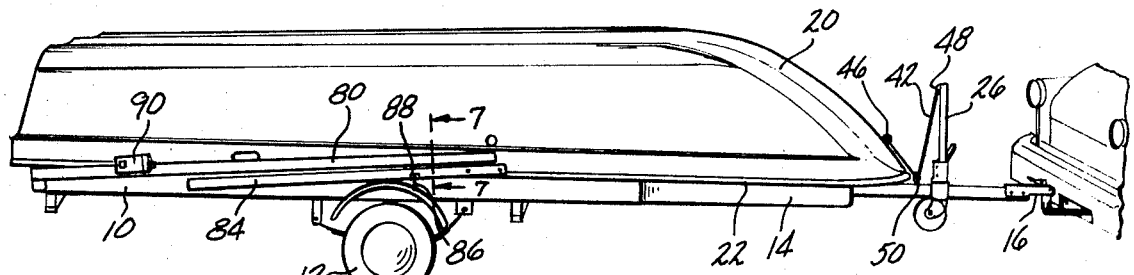
FIG. 1 is a side elevational view of a boat camp trailer embodying the invention with the boat loaded on the trailer ready to travel.

The trailer-and-tent arrangement employed in connection with the present invention is similar to that shown in the hereinabove-mentioned Gorman U.S. Pat. No. 3,348,874, a horizontal, rectangular frame portion 10 of the trailer being suspended on wheels 12 in the usual manner and having a tongue 14 extending forward from the frame 10 with a hitch 16 fastened securely at the front end of the tongue for attaching the trailer to the automobile or truck which is to haul it. A boat 20 is transported upside down on a generally horizontal platform 22, which is shaped to coincide with and fit the inverted upper edges or gunwales of the boat, so that the boat acts as a cover for equipment that is also carried on the trailer. Platform 22 is rigidly mounted on the upper side of the frame 10, and a caster wheel 24 is provided on the lower end of a jack post 26 on the tongue 14 of the trailer just in front of the bow of boat 20 for supporting the tongue when the trailer is not connected to the car.

Figure 4:
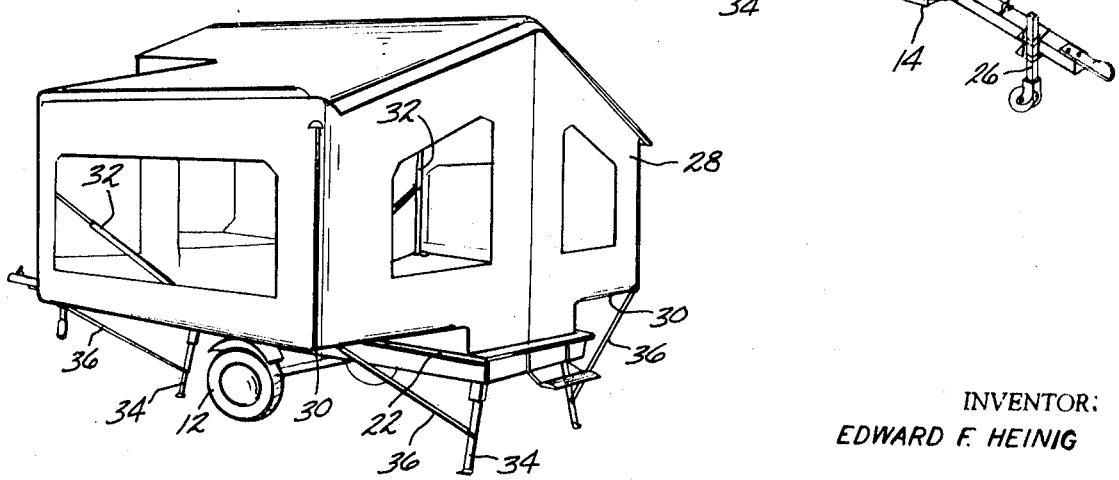
FIG. 4 is a perspective view as seen from the left rear of the trailer illustrating how the trailer provides a platform for a tent which is collapsed and stored beneath the boat when travelling.

Platform 22 is constructed so that it provides a suitable flooring for a tent 28 (shown erected in FIG. 4 and collapsed in FIG. 3), as well as storage space for other camping equipment and supplies when on the road. Folding or sliding floor extensions 30 (FIGS. 3 and 4) pull outwardly from both sides of the platform 22 to provide raised side rooms for double bunks on both sides of the main living area of the tent. A suitable, collapsible framework 32 of the telescoping-rod type is employed to hold the tent erect as shown in FIG. 4 after the extensions 30 have been spread outwardly of the platform 22.

Adjustable stabilizing legs 34 are located under the four corners of the platform 22 for levelling the body f the trailer and making it solid with the ground. Legs 34 are conventional in design and fold up under the platform while traveling. As best seen in FIG. 4, the extensions 30 are supported by diagonal braces 36, each of which is fastened at one end to an outer corner of an extension 30 and at its other end to the adjacent stabilizing leg 34.

When the boat camp trailer of the present invention is being transported from one place to another, the boat 20 is carried bottom up with the full length of its gunwales resting on the peripheral portion of platform 22, thereby providing a waterproof cover and enclosure for the tent and camping equipment stored under it. The boat is fastened to the trailer at the stern by a pair of detachable hinge assemblies 40 (more fully described hereinafter), one-half of each hinge assembly 40 being mounted on the upper edge of the transom 41 adjacent the side of the boat. A tiedown cable 42 at the bow has a snap fastener 44 for connecting one end to an eyebolt 46 on the bow of the boat, from which it is passed under a guide 50 mounted on the tongue 14 between the jack post 26 and the bow of the boat to a hook 48 that fits into the open upper end of jack post 26, which is desirably a hollow section of steel pipe. In order to lift the caster wheel 24 off the ground after the trailer has been hitched to the car, the jack post 26 is jacked upward, which in turn pulls the tiedown cable 42 tight, thereby securely anchoring the bow of the boat to the trailer.

Referring now more particularly to FIG. 5, each of the hinge assemblies 40 has a pair of U-shaped brackets 52,52 which fit over, and are bolted to, the upper edge of the transom 41 so that they straddle a cutout 54 therein. A hinge pin 56 which is rigidly fastened to the web portions of both brackets 52,52 spans the cutout 54 in he upper edge of the boat transom 41. A hook-shaped, hinge plate 58 is bolted to the rear edge of the platform 22 of the trailer with its hook portion 60 located to the rear of platform 22 and opening upwardly in order to receive the hinge pin 56 on the boat.

A locking tongue 62 with a downwardly bent end 64 fits lengthwise on top of the hinge plate 58 with its end 64 disposed over the opening of the hook 60 in order to prevent the hinge pin 56 from slipping out of the hook, thereby locking the two hinge parts together so that they cannot accidentally separate while while the boat is being loaded or unloaded. An elongated cover plate 66, which is U-shaped in cross section, fits over the locking tongue 62 with its side flanges 68,68 resting against the upper side of hinge plate 58 so that locking tongue 62 is freely slidable longitudinally within cover plate 66 from a locking position, in which its end 64 blocks the opening of the hook 60, to a retracted position, in which said end 64 is clear of the hook opening so that the hinge pin 56 can move into or out of the hook.

Hinge plate 58 and cover plate 66 are permanently bolted to the platform 22 of the trailer by means of bolts 70,70 which extend through elongated slots 72,72 in locking tongue 62 permitting it to slide freely between its locking and retracted positions. If desired, suitable means may be provided for preventing the locking tongue 62 from sliding out of its locking position so that the hinges cannot be accidentally disconnected when the trailer is on the road. For example, a thumbscrew 74 may be threaded through the cover plate 66 into a positioning recess 76 in the upper side of tongue 62. As shown in FIG. 6, a light compression spring 78 may also be placed in one of the slots 72 in locking tongue 62 so that it urges the locking tongue toward its locking position.

The hoisting means for lifting the bow of boat 20 and swinging it bodily about the hinges 40 includes a mast 80 mounted near the pivot axis of the hinges, which in this instance are located at the rear end of the boat and trailer so that the pivot axis is disposed transversely of the boat. Mast 80 is also mounted to one side of the boat 20 in order to be clear of the boat as it is swung end-over-end about its hinges 40. The lower end of mast 80 is pivoted to the frame 10 of the trailer at A so that it can be pivoted from its operative position shown in FIG. 3, in which it is substantially vertical, to a storage position along one side of the boat and trailer as shown in FIG. 1. The mast 80 is held in its upright position by a diagonal brace or strut 82 fastened at its upper end to the mast at a point B near the top of mast 80. The other end of strut 82 is fastened to frame 10 of the trailer at a point C sufficiently forward of the mast to provide good support.

In order to lower the mast without completely disconnecting strut 82, the latter is constructed so that it can buckle intermediate its ends, permitting the mast assembly to collapse to one side. To this end, strut 82 consists of a short upper section 83 and a long lower section 84, the adjoining ends of which overlap when the mast is in its operative position and are fastened together at two points by a nonremovable pivot pin at a point D and by a removable retaining pin 86. As long as the retaining pin 86 is in place holding the two sections 83 and 84 in alignment with each other, the mast is held rigidly in a vertical position for raising and lowering the boat 20. When it is desired to lower the mast to its storage position, pin 86 is removed and strut 82 buckled outwardly at its pivot point D as indicated by the phantom line showing in FIG. 3. It is understood of course that the upper and lower ends of strut 82 are pivoted to the mast and trailer, respectively, at the points B and C.

In order to permit the mast 80 to be erected and lowered so that the two sections of strut 82 are aligned when the mast is vertical and folded together when the mast is stored, the pivot point D on strut 82 must be located such that when the mast is in either its storage or operative positions, the distance from A to B plus the distance from B to D is substantially equal to the distance from A to C plus the distance from C to D. It will be noted that in order for the mast 80 to lie substantially horizontally in its storage position, as shown in full lines in FIG. 1 and in broken lines in FIG. 3, the pivot point C for the supporting strut is located somewhat below the level of the pivot point A for the mast so that when the mast assembly is collapsed, the mast lies on top of the lower section 84 of the strut. In this instance all three parts of the mast assembly, namely the mast 80, upper strut section 83 and lower strut section 84, are made of suitable lengths of U-shaped metal channel. Mast 80 and lower section 84 of the supporting strut have the same cross-sectional dimensions with their open sides facing each other. The upper section 83 of supporting strut 82 is smaller in cross section, so that it fits completely within the side flanges of the channels of mast 80 and lower strut section 84. Consequently, when the mast assembly is collapsed to its storage position as shown in FIG. 3, the upper section 83 nests within the facing open channels of the mast and lower strut section 84 (FIG. 7). The mast assembly accordingly folds or collapses into a small space and is completely out of the way when not in use.

An apertured bracket 88 (FIGS. 3 and 7) is provided on the frame 10 of the trailer near the outer end of strut section 84 in its collapsed position for securing the mast assembly in place when stored. The lower strut section 84 is provided with openings 89,89 through both flanges which align with the opening in bracket 88 when the mast assembly is collapsed as shown in FIGS. 1 and 7. Since the retaining pin 86 must be removed in order to lower the mast, it is also available for locking the assembly in its storage position. To this end, retaining pin 86 is inserted through bracket 88 and the openings 89,89 in lower strut section 84. In order to prevent pin 86 from becoming accidentally disengaged, it is provided with a lateral projection or lug 85 which fits through the opening in bracket 88 and through openings, 89,89 in strut section 84, all of which are keyholed shaped for insertion of retaining pin 86 when it is rotated for proper alignment of lug 85. After pin 86 is inserted through bracket 88 and strut section 84 as shown in FIG. 7, it is rotated a few degrees so that it cannot be withdrawn. In like manner, the openings through which pin 86 is inserted for locking the two strut sections 83 and 84 in the operative position of the mast assembly are also keyhole shaped in order to permit the lug 85 to be inserted through them and locked in place. Retaining pin 86 has a laterally bent handle 87 at its outer end for facilitating its insertion and removal in erecting and storing the mast.

A winch 90 is mounted on mast 80 at a convenient height above the ground for manual operation by the person loading or unloading the boat. Winch 90 has a handcrank 92 and a cable 94 that travels vertically upward within the channel of mast 80 and between a pair of horizontally disposed guide rollers 96,98 (FIG. 8) rotatably mounted within the flanges of the channel at the top of mast 80. Depending on which side of the mast the boat is located at any particular time, the cable 94 will travel over one or the other or rollers 96,98 to the boat 20. The free end of cable 94 is provided with a snap fastener or locking hook of some sort, which is removably attached to an eyebolt or ring cleat 100 mounted on the side of the boat toward the front. The most desirable location for the eyebolt 100 depends on the height of the guide rollers 96,98 above the axis of the hinges 40 about which the boat is swung and the angle which the winch cable 94 makes with the boat when it is in a horizontal position either in its inverted position on the trailer or in its unloaded position to the rear of the trailer. The height of mast 80 and guide rollers 96,98, on the other hand, depends on the length and weight of the boat, while the angle between the cable and the horizontal boat should be selected so as to require as little force as possible to lift the boat when it is in a horizontal position. However, as will become more apparent hereinafter the most suitable arrangement is to make the mast about the same height as the distance from the hinges 40 to the point at which the winch cable is attached to the boat.

The winch 90 is desirably of the type that has a worm gear mechanism which prevents the winch reel from being reversed by the weight of the boat on the cable 94 when the handcrank 92 is released, yet permits the cable to be paid out gently on reversing the direction in which handcrank 92 is rotated. Winch 90 is mounted on the back side of mast 80 such that the reel (not shown) on which the cable 94 is wound projects through an opening in the web portion of the channel of the mast, permitting the reel to pay out the cable freely on the inside of the channel.

In unloading the boat while the trailer is still attached to the car, it is only necessary to release the bow of the boat from the trailer by lowering the jack post 26 enough to loosen the cable 42 so that it can be detached from the eyebolt 46, set up the mast 80 and swing the boat end-over-end to the rear of the trailer by means of the winch 90. Raising the mast 80 is done quickly by simply removing locking pin 86 from the bracket 88 so that the mast assembly is free to be raised, as indicated by the broken line showing in FIG. 3, to its operative position as shown in full lines. A handle 102 is provided on mast 80 above winch 90 in order to facilitate lifting it into a vertical position where the strut sections 83 and 84 of the supporting strut 82 align with each other. The locking pin 86 is then inserted through the holes in the sections 83 and 84 above the fixed pivot pin at D so that the strut 82 and mast 80 are locked in place. The end of the winch cable 94 is then attached to the eyebolt 100 on the boat and tension taken on it by rotating the handcrank 92 on winch 90 in the proper direction in order to reel in the cable 94 and to lift the boat upward about its stern to the full-line position shown in FIG. 3.

In order to maintain complete control of the boat at all times, the guide rollers 96 and 98, over which the winch cable 94 is trained, should be located at a height on mast 80 which is only slightly less than the height reached by the eyebolt 100 as the boat approaches and passes the mast. As the boat continues to be hoisted off the platform 22 of the trailer and into a vertical position, more and more of the weight of the boat is transferred from the winch cable to the hinges 40 at the stern of the boat. As the center of gravity of the boat passes the vertical plane through the axis of hinges 40, there is little or no tension on the winch cable, thereby allowing the cable to shift from the guide roller 98, over which it is initially trained as the best is being lifted upward off the platform 22, to its companion roller 96. The transfer of the winch cable 94 from one guide roller to the other is enhanced by positioning the eyebolt 100 so that it is just above the upper end of mast 80. The cable then simply shifts from one roller to the other with a minimum of movement of the boat as it crosses dead center. Loss of tension on the cable 94 is therefore limited to the instant that the cable shifts between the rollers, and movement of the boat is therefore kept closely under the control of the winch 90. It will be appreciated, however, that even if the eyebolt 100 were to pass some distance above or below the point at which cable 94 emerges from mast 80, the boat can be easily moved form one side of mast 80 to the other with one hand despite its weight. Furthermore, various guide means for the winch cable can be employed other than the guide rollers 96 and 98 which, however, have the great advantage of simplicity and reliability.

Figure 2:
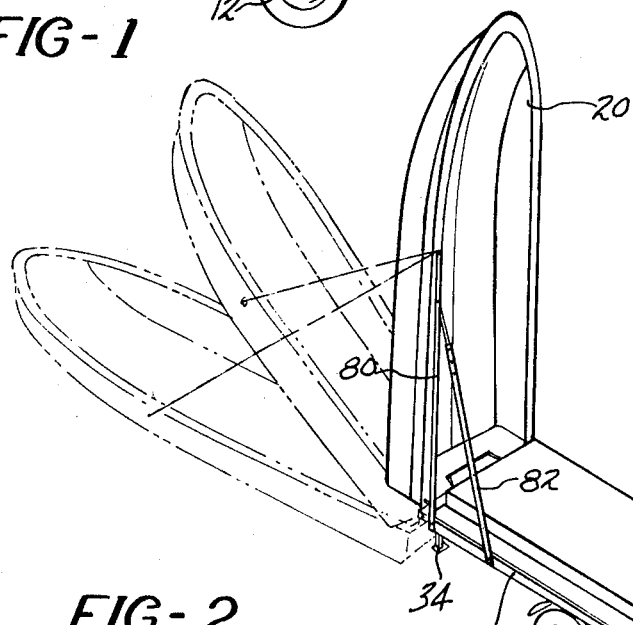
FIG. 2 is a more or less diagrammatic perspective view of the same, showing how the boat is unloaded.

Continued pivotal movement of the boat in a counterclockwise direction as viewed in FIG. 3 causes some of the weight of the boat to be taken again by cable 94 which, however, is not free to run out because of the worm gear design of winch 90. On reversing the direction of rotation of handcrank 92 on the winch 90, cable 94 may be paid out at the desired rate, so that the boat can be lowered to the rear of the trailer as illustrated in FIG. 2. As may be seen in FIG. 8, the web of the channel of mast 80 is notched at 104 at the top of the mast in order to provide clearance for cable 94 between roller 96 and the boat as it reaches the ground. With the boat upright and extending to the rear of the trailer, it is detached from the trailer by moving the locking tongue 62 on each of the hinges 40 to its retracted position so that the hinge pin 56 can be lifted out of the hook portion 60 of the hinge plate 58. Loading the boat onto the trailer is accomplished as readily as unloading, by simply reversing the procedure just described.

It will be apparent from the foregoing that the boat is completely under control all the time it is being swung onto or off the trailer. Due to the fact that the winch cannot be reversed except by manually reversing the handcrank 92, movement of the boat can be stopped at any point in the arc through which it swings, and the boat is readily eased onto the ground or back onto the trailer. Furthermore, there is no danger of the boat suddenly dropping from an elevated position with the possibility of hurting someone who might be in the way or of damaging the boat. In addition, loading and unloading is easily accomplished by just one person who can set up the hoist and then manipulated the boat entirely by means of the winch with no assistance from anyone.

It will also be noted that the hinges 40 are positioned on the trailer at about the same height above the ground as the top of the transom of the boat so that the boat can be easily connected to the trailer by means of the hinges. This can be done while the boat is still in the water or while partially beached stern first. Again one person by himself can attached the boat to the trailer by connecting or disconnecting the hinges one at a time. If it is desired to load the boat onto the trailer after the trailer has been unhitched from the car, the stabilizing legs 34 on the trailer are first lowered before the boat is connected to the trailer by means of hinges 40. The boat can then be loaded onto the trailer in the manner hereinbefore described.

The invention is also applicable to loading and unloading a boat sideways onto and off of a trailer. Thus, as illustrated more or less diagrammatically in FIG. 9, a pair of spaced hinges 40' may be disposed along one side of the trailer 10' and along the gunwale at one side of boat 20', which is carried as before in an inverted position on the trailer. A demountable mast 80' is provided similar to that shown in connection with the embodiment of the invention shown in FIG. 3 but is mounted on the trailer 10' so that it is rearward of the stern of the boat with its collapsible supporting strut 82' extending transversely of the trailer in back of the boat. The winch cable 94' is attached to the opposite side of the boat transom from mast 80', and the winch 90' is operated in order to swing the boat sideways about the hinges 40'. Since the hoisting mast 80' is mounted on or near the axis of hinges 40', lifting and lowering of the boat is done entirely by the winch 90' as before. In this case, it is again desirable to make the height of the mast about equal to the distance between the hinge axis and the point of attachment of cable 94' to the boat.

What is claimed is:

1. A boat and trailer combination in which the boat is carried by the trailer in an inverted position with the boat detachably hinged to the trailer adjacent one of its longitudinal and transverse extremities with the pivot axis about which the boat is hinged disposed adjacent a peripheral portion of the boat and parallel to one of its longitudinal and transverse axes, such that the boat can be swung through substantially 180° between its inverted position on the trailer and an unloaded position adjacent the trailer, hoisting means for swinging the boat about said pivot axis for loading the boat onto and unloading it from said trailer, said hoisting means comprising in combination, a mast mountable near said pivot axis and clear of the boat in the direction of said pivot axis, a winch having a hoisting line supported by said mast for swinging the boat about said pivot axis, fastening means for attaching said hoisting line to said boat at a predetermined distance from said pivot axis, and guide means on said mast over which said hoisting line is trained as it passes from said winch to said fastening means on the boat, said guide means being located on said mast a predetermined distance above said pivot axis, the distances of said fastening means and said guide means from said pivot axis being selected such that adequate leverage is provided for lifting and lowering the boat about said pivot axis.

2. The combination defined in claim 1, wherein said fastening means and said guide means are spaced at substantially equal distances from said pivot axis so that as the boat is pivoted from a horizontal position to a vertical position, said fastening means on the boat passes near said guide means on said mast.

3. The combination defined in claim 1, wherein the boat is hinged at its stern to the rear of the trailer, said mast being mountable at the rear of the trailer to one side of the boat.

4. The combination defined in claim 3, wherein said mast comprises an upright member pivotally mounted on said trailer so that it can be swung from its operative position to a storage position in which it is disposed substantially parallel with the body of the trailer, said mast also including means for bracing said upright member in its operative position.

5. The combination defined in claim 3, wherein said mast comprises an upright member mountable on said trailer in a substantially vertical position, said winch being mounted on said upright member at a convenient height for manipulation by the operator.

6. The combination defined in claim 1, wherein said boat is hinged at one side to the side of the trailer, said mast being mountable adjacent said one side of the boat and clear of the boat in the direction of said pivot axis so that it does not interfere with the boat as the boat is swung sideways while being loaded and unloaded.

7. The combination defined in claim 6, wherein said boat is carried bow first on said trailer and said mast is mounted rearward of the stern of the boat.

8. The combination defined in claim 3, wherein said winch is reversible only upon reversing the power input thereto.

9. The combination defined in claim 4, wherein said bracing means comprises an elongated strut having an upper section pivoted at one end to said upright member at a point spaced from its pivotal mounting on the trailer, said strut having a lower section pivoted at one end to said trailer at a point spaced from said upright member, pivot means connecting said upper and lower strut sections to each other adjacent their other ends and overlapping each other when aligned, said upright member being in its operative position when said strut sections are aligned, and means for releasably fastening said strut sections at a second point in their overlapping portions spaced from said pivot means in order to lock said strut sections in alignment with each other and to fix said upright member in its operative position.

10. The combination defined in claim 9, wherein the distance from the point at which said upright member is pivoted to the trailer to the point at which said upper strut section is pivoted to said upright member plus the distance from the pivot point of said upper strut section with said upright member to said pivot means is substantially equal to the distance from said pivot point of said upright member with the trailer to the pivot point of said lower brace member with the trailer plus the distance from said pivot point of said lower brace with the trailer to said pivot means, such that said upright member may be swung down so that it and said strut sections lie substantially parallel or flush with the body of the trailer while maintaining said pivotal connections with each other.

11. The combination defined in claim 10, wherein said upright and strut sections comprise U-shaped channels, the inside dimensions of the channel of said upright member and lower strut section being substantially the same and large enough to receive the outside dimensions of said upper strut section, the open side of the channels of said upright member and said lower strut section facing each other such that said upper strut section is pivotally connected within the side flanges of said upright member and lower strut section and is completely nested therein when in the stored position of said mast.